(Model.)

S. W. ROBINSON & L. C. KISER.
AIR COMPRESSOR.

No. 248,218.

Patented Oct. 11, 1881.

3 Sheets—Sheet 2.

Witnesses:
John E. Kenon
Edw. W. Byrn

Inventor:
S. W. Robinson
L. C. Kiser
By ____ Attorneys.

(Model.)

3 Sheets—Sheet 3.

S. W. ROBINSON & L. C. KISER.
AIR COMPRESSOR.

No. 248,218.

Patented Oct. 11, 1881.

WITNESSES:

INVENTOR:
Stillman W. Robinson
Lewis Cass Kiser
BY
ATTORNEYS.

UNITED STATES PATENT OFFICE.

STILLMAN W. ROBINSON AND LEWIS C. KISER, OF COLUMBUS, ASSIGNORS TO KISER COMPRESSED AIR COMPANY, OF URBANA, OHIO.

AIR-COMPRESSOR.

SPECIFICATION forming part of Letters Patent No. 248,218, dated October 11, 1881.

Application filed February 11, 1881. (Model.)

*To all whom it may concern:*

Be it known that we, STILLMAN W. ROBINSON and LEWIS CASS KISER, of Columbus, in the county of Franklin and State of Ohio, have invented a new and useful Improvement in Air-Compressors; and we do hereby declare that the following is a full, clear, and exact description of the same.

The invention relates to certain improvements in air-compressors; and it consists, first, in the novel arrangement of the parts designed to secure compactness and general efficiency; secondly, in the peculiar connection of the pitmen to the same crank; and, thirdly, to the peculiar construction and arrangement of the air-valves and seats in a pocket or case, as will be hereinafter more fully described.

Figure 1:
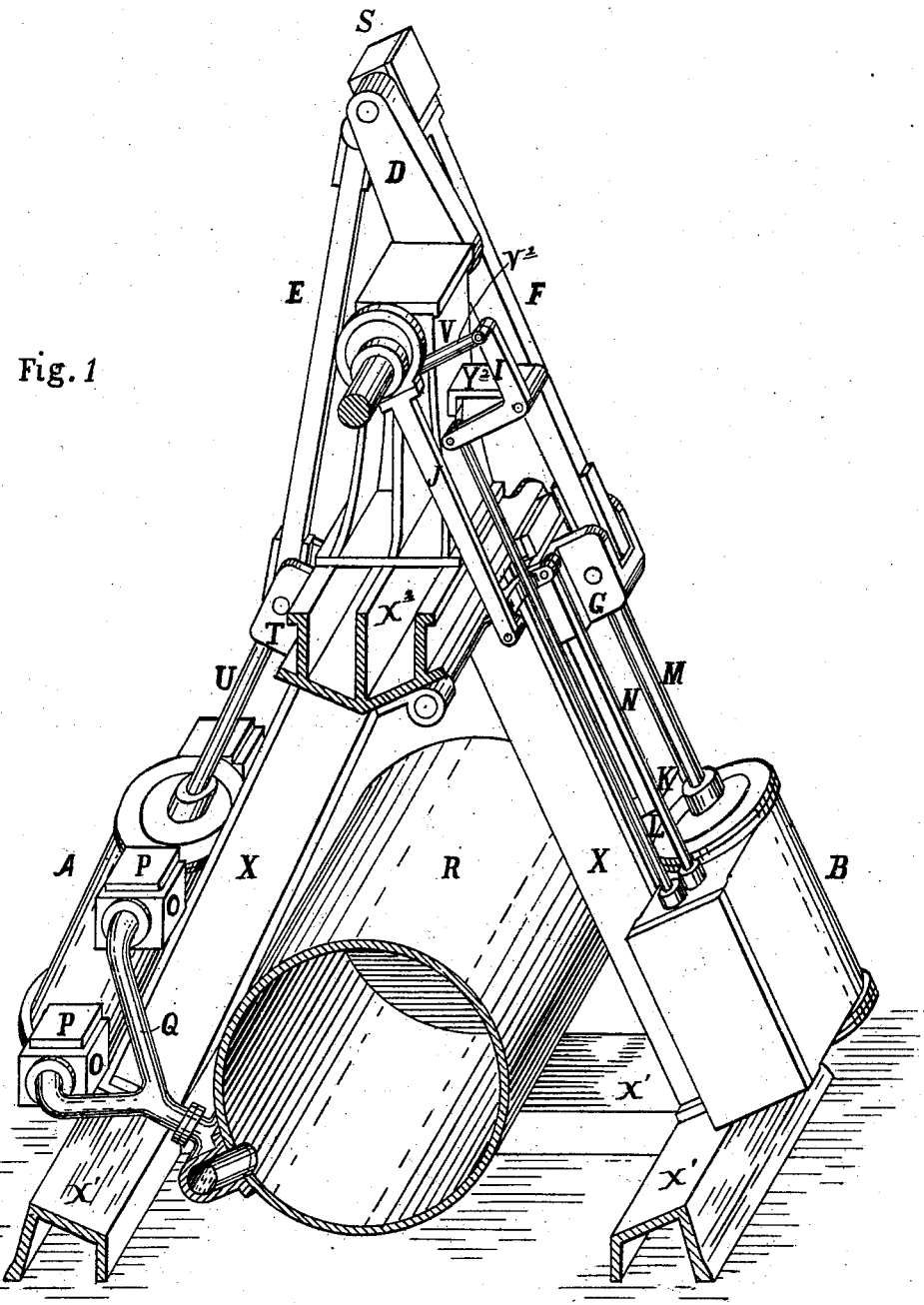
Figure 2:
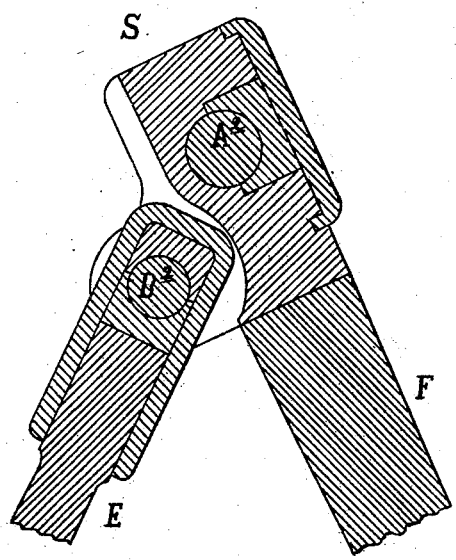
Figure 3:
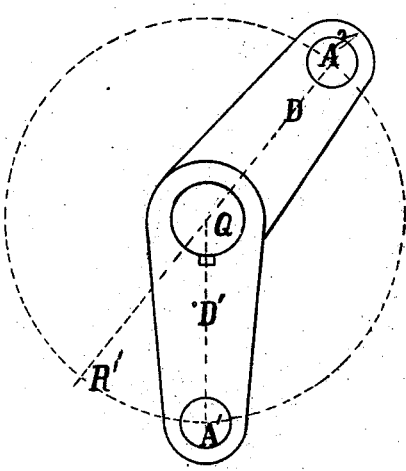
Figure 4:
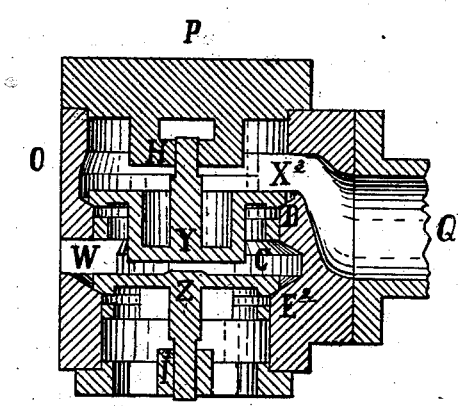
Figure 5:
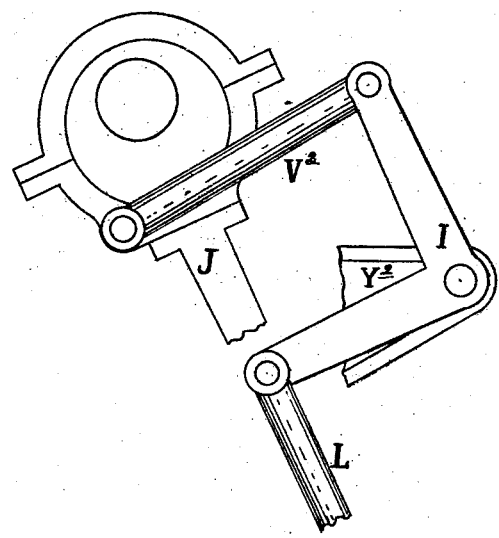
Figure 6:
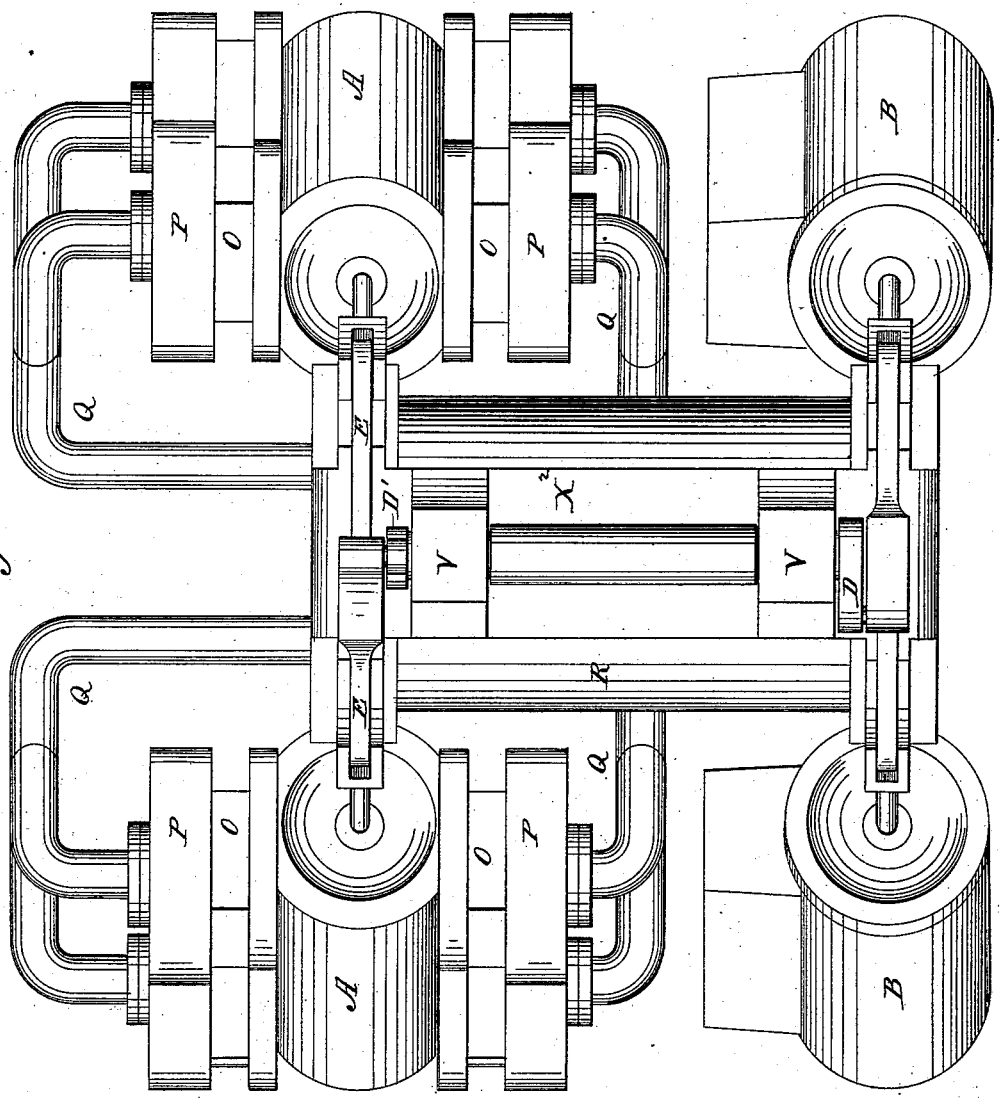

In the accompanying drawings, Figure 1 is a perspective view of the remote half of the machine as divided by a plane perpendicular to the main shaft. Fig. 2 shows the manner of joining a pair of connecting-rods, adapting them to work on a common crank. Fig. 3 shows the angular arrangement of cranks at opposite ends of the shaft. Fig. 4 is a sectional view of the air-valves and containing-pockets. Fig. 5 is a projection of the device for working the cut-off valve. Fig. 6 is a plan view of the compressor, showing two air-cylinders at one end and two steam-cylinders at the other end of the crank-shaft.

The frame of the machine consists of four inclined upright pieces, X, a rectangular bed-piece, X', a head-block, X², parallel to the main shaft, and two standards, V, carrying the main shaft, all of which are arranged in the manner indicated in Fig. 1, which is a perspective of half of the frame and attachments, the other like half being cut away by a plane passed perpendicular to the main shaft.

The general form of the frame is that of the letter A, which furnishes suitable provision for the frame and air-receiver R, which is located within the frame, as shown, in compact convenient form, all complete in one. There are four double-acting cylinders—two steam-cylinders and two air-cylinders—one of which is bolted to each of the inclined upright pieces X. The cross-head guides N are also secured to the pieces X.

The bearing for the crank-pin $A^2$ is in a block, S, (see Fig. 2,) to which the connecting-rod F is rigidly secured, and in which is fixed the joint-pin $B^2$ for the connecting-rod E for the cylinder on the other side. By this arrangement the total pressure on the crank-pin $A^2$ is only the resultant of the two forces due to the two cylinders, the sum of two forces acting at an angle being always greater than the resultant. The frictional resistance is reduced by the introduction of this joint, for the reason that the total friction is proportional to the total pressure. The crank D is shown in Figs. 1 and 3, D' being the crank at the other end of the main shaft. It is found that when one expansion-steam cylinder, B, and one air-compression cylinder, A, are placed to work in common upon one crank, D, as shown in Fig. 1, we secure for a certain relation of the point of cut-off and angle between cylinders approximate equalization of the power and resistance; also, for a further equalization of the power and resistance it is necessary that the crank D be in certain angular relation with the crank D' at the other end of the main shaft. This angle varies with conditions, and is indicated at A' Q R', Fig. 3.

As a modification of the arrangement shown we may place the two steam-cylinders B B to work in common upon the one crank, D, and the two air-cylinders to work in common upon the crank D', at the other end of the shaft, as shown in Fig. 6, thus securing substantially the same equalization of power and resistance by a certain angular relation of the cranks D and D'. This is evident from the fact that in the steam-expansion cylinder most of the work is developed at the beginning of the stroke, while in the air-compression cylinder the resistance is mostly near the end of its stroke, and these are required to be placed in simultaneous action.

The device for operating the cut-off valve is shown in Figs. 1 and 5, in which L is the cut-off valve-rod, I a bell-crank with fixed fulcrum $Y^2$, and $V^2$ a link connecting it with the strap of the eccentric which works the main valve. By this arrangement, when the main valve is at rest on the dead-centers, the cut-off valve is under quite rapid motion, thus giving the desired relation of valve-movement.

The air-valves are contained in a case or pocket, one of which pockets is placed at each end of the air-cylinder, as shown on the left side of Fig. 1. There may, however, be several at each end of the cylinder, and they may be placed on opposite sides of the cylinder. The construction of these pockets and contained valves is shown in the sectional view, Fig. 4. Two valves are shown as contained by the pocket, one of which, Z, is for induction of air to the cylinder, while the other, Y, is for eduction therefrom through the pipe Q to the receiver. In the process of induction the valve Z opens and atmospheric air enters the space between the valves, and thence passes through the side opening W into the cylinder. In eduction the air returns through W to the space between the valves, and thence through the eduction-valve Y, passage $X^3$ and pipe Q, to the receiver. This action of the valves is evident from the fact that both valves open upward. These pockets are connected between the air-compression cylinder A and eduction-pipes Q leading to the receiver, as shown at O O, Fig. 1. They are packed between plain air-tight parallel seats and secured by bolts in such a way that by removal of the bolts the pockets and contained valves may readily be removed and others substituted, as desired, in making repairs.

The bolt-holes through the sides of the pockets for securing them to the cylinder should be symmetrically arranged. Then when the bolt-holes in the seats upon the cylinder are arranged accordingly it is evident that any one of the pockets, all being alike, will fit any seat upon a cylinder. Similarly the bolts for securing the flange of the eduction-pipe Q should be symmetrically arranged as regards the pocket. Then any pocket will fit any seat or flange and be perfectly interchangeable.

Instead of constructing the pockets and valves as shown in Fig. 4, we may find it desirable to put but one valve in a pocket, the same answering for induction or else eduction. In any case, however, the pockets for a like purpose should be interchangeable in the manner above explained. Again, one set of bolts may secure the joints at both sides of the pockets, or with a separate set of bolts the joints or seats are not necessarily parallel.

Having thus described our invention, what we claim as new is—

1. An air-compressor composed of the triangular frame $X X' X^2$, the receiver R, contained in the same, four cylinders arranged at the four corners of this frame, two of which are for air and two for steam, and a single shaft located at the apex of the frame, and provided at its opposite ends with cranks D D', each of which is connected with a pair of cylinders at one end of the compressor, and which cranks are arranged in the relation described for securing equalization of power and resistance, as set forth.

2. The combination, with two connecting-rods and a single crank, of a block, S, rigidly connected to one of the rods and turning upon the crank-pin, and carrying also the joint-pin for the other connecting-rod, as and for the purposes specified.

3. The combination, with the air-cylinder A and eduction-pipes Q, of pockets O, containing valves Z and Y, and passages W and $X^3$, said pockets being interchangeable, as and for the purposes specified.

STILLMAN W. ROBINSON.
LEWIS CASS KISER.

Witnesses:
R. A. NESSNUTH,
M. E. ROBINSON.